US012637970B2

(12) United States Patent
Munirathna et al.

(10) Patent No.: US 12,637,970 B2
(45) Date of Patent: May 26, 2026

(54) INTERNAL ENGINE COMBUSTION SYSTEM

(71) Applicant: Volvo Truck Corporation, Gothenburg (SE)

(72) Inventors: Mohan Kumar Munirathna, Karnataka (IN); Satheesha Krishna, Bangalore (IN); Alokekumar Das, Bangalore (IN); Roy Mathew, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/972,917

(22) Filed: Dec. 7, 2024

(65) Prior Publication Data

US 2025/0198320 A1 Jun. 19, 2025

(30) Foreign Application Priority Data

Dec. 15, 2023 (EP) .................................... 23217203

(51) Int. Cl.
*F01N 3/20* (2006.01)
*F01N 3/28* (2006.01)
*F02B 37/00* (2006.01)

(52) U.S. Cl.
CPC ......... *F01N 3/2892* (2013.01); *F01N 3/2013* (2013.01); *F01N 3/208* (2013.01); *F02B 37/00* (2013.01)

(58) Field of Classification Search
CPC ...... F01N 3/2892; F01N 3/2013; F01N 3/208; F01N 13/00; F01N 13/08; F01N 13/224;
(Continued)

(56) References Cited

U.S. PATENT DOCUMENTS 6,151,893 A * 11/2000 Watanabe ........... F01N 13/1816 285/299
6,315,332 B1 * 11/2001 Aschoff .............. F01N 13/1816 285/227
(Continued)

FOREIGN PATENT DOCUMENTS

CN 110821610 A 2/2020
DE 102004020138 A1 11/2005
(Continued)

OTHER PUBLICATIONS

Extended European Search Report for European Patent Application No. 23217203.1, mailed Apr. 17, 2024, 7 pages.

*Primary Examiner* — Dapinder Singh
(74) *Attorney, Agent, or Firm* — Withrow & Terranova, PLLC

(57) ABSTRACT

An internal combustion engine (ICE) system, comprising an ICE; an exhaust conduit for transporting exhaust gases from the ICE to an exhaust outlet; an exhaust aftertreatment system (EATS) disposed in the exhaust conduit downstream the ICE; a flex bellow disposed in-between the ICE and the EATS; and a heater arrangement, the heater arrangement being arranged within the flex bellow and further provided in the form of a coil having one or more heating regions and one or more portions configured to induce turbulent flow of the exhaust gases. The present disclosure furthermore relates to a vehicle comprising the ICE system.

14 Claims, 3 Drawing Sheets

(58) Field of Classification Search
CPC .......... F01N 13/20; F01N 13/16; F02B 37/00; Y02T 10/12; Y02T 10/40; Y02A 50/20
See application file for complete search history.

(56) References Cited

U.S. PATENT DOCUMENTS

| | | | | |
|---|---|---|---|---|
| 6,341,805 | B1 * | 1/2002 | Thomas | F01N 13/1816 285/236 |
| 6,419,280 | B2 * | 7/2002 | Uegane | F01N 13/1816 285/299 |
| 9,151,208 | B2 * | 10/2015 | Schumnig | F01N 13/10 |
| 10,883,405 | B1 * | 1/2021 | Hornback | F01N 13/1805 |
| 2002/0078685 | A1 * | 6/2002 | Smatloch | F01N 13/009 60/322 |
| 2017/0014764 | A1 | 1/2017 | Crawford et al. | |
| 2023/0109112 | A1 | 4/2023 | Svraka et al. | |

FOREIGN PATENT DOCUMENTS

| | | | |
|---|---|---|---|
| FR | 2978204 | A1 | 1/2013 |
| GB | 2307293 | A | 5/1997 |
| GB | 2307293 | A8 | 6/1997 |
| WO | 2005103459 | A1 | 11/2005 |

* cited by examiner

INTERNAL ENGINE COMBUSTION SYSTEM

PRIORITY APPLICATIONS

The present application claims priority to European Patent Application No. 23217203.1, filed on Dec. 15, 2023, and entitled "INTERNAL ENGINE COMBUSTION SYSTEM," which is incorporated herein by reference in its entirety.

TECHNICAL FIELD

The disclosure relates generally to an internal combustion engine (ICE) system. In particular aspects, the disclosure relates to an ICE system comprising a flex bellow and a heater arrangement. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Heavy-duty vehicles, such as trucks, buses etc. comprising a combustion engine, such as a diesel engine, are typically provided with an exhaust aftertreatment system, EATS, to reduce the emission from the combustion engine.

For such EATS arrangements a diesel oxidation catalyst (DOC), a diesel particulate filter (DPF) and one or two selective catalytic reduction SCR catalyst(s) are generally used.

These systems use liquid reducing agents such as ammonia, urea, and the like. The reducing agent is sprayed into the SCR catalyst through a nozzle, or the like, and a chemical reaction is provided between the exhaust from the engine and the reductant, which reduces the amount of NOx ultimately discharged from the EATS.

The EATS generally consists of a tubular, longitudinal body with an inlet and an outlet, wherein the inlet is arranged on the exhaust side of the ICE, for receiving exhaust gas emissions from the ICE, and an outlet is arranged for discharging exhaust gas emissions treated in the catalytic converter. The inlet is in flow communication with the outlet.

Due to stricter requirements, there is a need to further reduce the NOx discharge from the EATS.

In view of the above, the present disclosure aims to provide an ICE system which further reduces the NOx discharge from the EATS.

SUMMARY

According to a first aspect of the disclosure, the present disclosure relates to an internal combustion engine (ICE) system comprising:

- an ICE;
- an exhaust conduit for transporting exhaust gases from the ICE to an exhaust outlet;
- an EATS disposed in the exhaust conduit downstream the ICE;
- a flex bellow disposed in-between the ICE and the EATS; and
- a heater arrangement, the heater arrangement being arranged within the flex bellow and further provided in the form of a coil having one or more heating regions and one or more portions configured to induce turbulent flow of the exhaust gases.

The first aspect of the disclosure may seek to induce turbulent flow and heating of the exhaust gas entering the EATS system. A technical benefit may include to improve the efficiency of the EATS system thereby further reducing the amount of NOx discharged from the EATS.

The heating may, for example, constitute of electrical heating.

Optionally in some examples, including in at least one preferred example, the ICE system comprises a turbocharger arrangement having a turbine disposed downstream the ICE in the exhaust conduit and wherein the flex bellow is disposed in-between the turbine and the EATS. A technical benefit may include that the flex bellow prevents, at least partially reduces, the vibrations from the turbocharger to reach the EATS.

Optionally in some examples, including in at least one preferred example, the coil is any one of a helical-shaped coil, spiral shaped coil or a conical shaped coil. A technical benefit may include a temperature increase combined with a reduced pressure drop of the exhaust gas due to the specific shape of the heater arrangement.

Optionally in some examples, including in at least one preferred example, the coil extends along ⅓ or more of a length of the flex bellow. A technical benefit may include a temperature increase combined with a reduced pressure drop of the exhaust gas.

Optionally in some examples, including in at least one preferred example, the coil extends along ½ or more of a length of the flex bellow. A technical benefit may include a further temperature increase combined with a reduced pressure drop of the exhaust gas.

Optionally in some examples, including in at least one preferred example, the coil extends along the entire length of the flex bellow. A technical benefit may include a maximized temperature increase combined with a reduced pressure drop of the exhaust gas.

Optionally in some examples, including in at least one preferred example, the heater arrangement is arranged with a distance to an inner surface of the flex bellow, thereby providing a gap between the heater arrangement and the inner surface of the flex bellow. A technical benefit may be that a larger surface area of the heater arrangement is exposed to the air flow which enhances the heating efficiency. This has additionally been found to further induce turbulent flow of the exhaust gas, thereby improving the efficiency of the EATS when the exhaust gas enters the EATS.

Optionally in some examples, including in at least one preferred example, the heater arrangement is connected to an inner surface of the flex bellow by one or more connection points. A technical benefit may include an improved structure for inducing turbulent flow of the exhaust gas, thereby further improving the efficiency of the EATS when the exhaust gas enters the EATS.

Optionally in some examples, including in at least one preferred example, the one or more connection points comprises an insulating flexible material. This has been found to avoid transfer of heat from the heating arrangement to the inner surface of flex bellow.

Optionally in some examples, including in at least one preferred example, the one or more connection points comprise(s) a spring connection. This has been found to minimize the vibrations transferring to the coil by providing damping.

Optionally in some examples, including in at least one preferred example, a first reductant injector for introducing a liquid reducing agent, such as urea, is arranged in-between the turbine and the flex bellow. The fact that the flex bellow with the heater is arranged downstream the first reductant injection has the advantage of the heating the reductant prior to entering the EATS. A further technical advantage is an improved distribution of the reductant in the exhaust gas caused by the turbulent gas flow. A technical benefit may include an improved efficiency of the EATS system.

Optionally in some examples, including in at least one preferred example, the one or more heating region is/are arranged in an upstream portion of the flex bellow, the upstream portion constituting of ⅓ of the flex bellow, as seen in a length direction (L) of the flex bellow. A technical benefit may include an improved initial heating of the exhaust gas which will enhance the chemical reactions between injected urea and exhaust gases in reducing NOx parameters in the exhaust gases.

Optionally in some examples, including in at least one preferred example, the heater arrangement is provided in the form of a coil comprising two or more loops. A technical benefit may include to further induce the turbulent flow of the exhaust gas, thereby improving the efficiency of the EATS when the exhaust gas enters the EATS.

Optionally in some examples, including in at least one preferred example, the heater arrangement is provided in the form of a coil comprising three or more loops. A technical benefit may include to even further induce the turbulent flow of the exhaust gas, thereby improving the efficiency of the EATS when the exhaust gas enters the EATS.

Optionally in some examples, including in at least one preferred example, the one or more heating regions extend over at least ⅓ of a total length of the coil. A technical benefit may include, uniform temperature maintained throughout the length of the flex bellow.

Optionally in some examples, including in at least one preferred example, the one or more heating regions extend over the entire length of the coil. A technical benefit may include a uniform temperature maintained throughout the entire length of the flex bellow.

Optionally in some examples, including in at least one preferred example, the second turbulent flow inducing device is a stationary propeller-shaped device. A technical benefit may A technical benefit may include an improved mixing of the urea in the exhaust gas prior to entering the EATS system and an increased efficiency of the EATS system.

Optionally in some examples, including in at least one preferred example, the stationary propeller-shaped device is arranged within the coil. A technical benefit may include a further improved mixing of the urea in the exhaust gas prior to entering the EATS system and an increased efficiency of the EATS system.

Optionally in some examples, the EATS may include one or more of; a DOC, a DPF and one or two SCR catalysts.

According to a second aspect of the disclosure, A vehicle comprising the ICE system according to the first aspect is provided. The second aspect of the disclosure may seek to induce turbulent flow and heating of the exhaust gas entering the EATS system. A technical benefit may include to improve the efficiency of the EATS system of the vehicle thereby further reducing the amount of NOx discharged from the EATS.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

SCR is an effective exhaust aftertreatment technology for reducing nitrogen oxide (NOx) emissions. Currently, SCR catalysts are widely used in heavy-duty vehicles due to NOx emission regulations.

These systems use liquid reducing agents such as ammonia, urea, and the like. The reducing agent is sprayed into the SCR catalyst through a nozzle, or the like, and a chemical reaction is provided between the exhaust from the engine and the reductant, which reduces the amount of NOx ultimately discharged from the EATS.

To meet further stricter requirements, there is a need to further reduce the NOx discharge from the EATS.

According to one aspect of the disclosure, the ICE system as described herein may seek to induce turbulent flow and heating of the exhaust gas entering the EATS system. A technical benefit may include to improve the efficiency of the EATS system thereby further reducing the amount of NOx discharged from the EATS.

Figure 1:
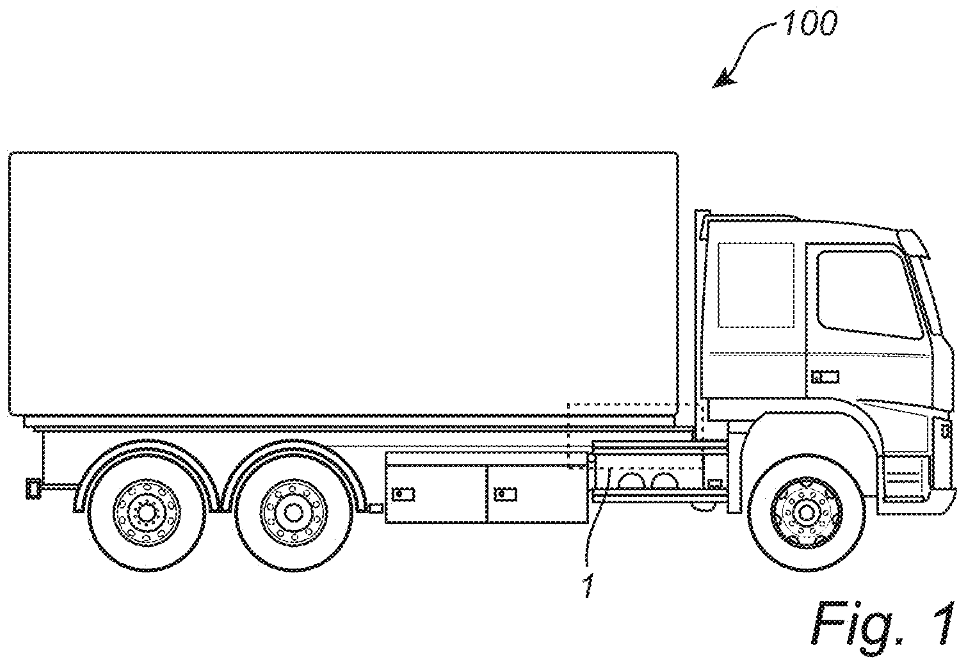
FIG. 1 is a side view of a vehicle according to an example.

FIG. 1 illustrates a vehicle 100 according to an example. The vehicle 100 comprising an internal combustion engine (ICE) system 1. The vehicle 100 depicted in FIG. 1 is a truck 100 for which the inventive concept which will be described in detail below, is suitable for.

Figure 2:
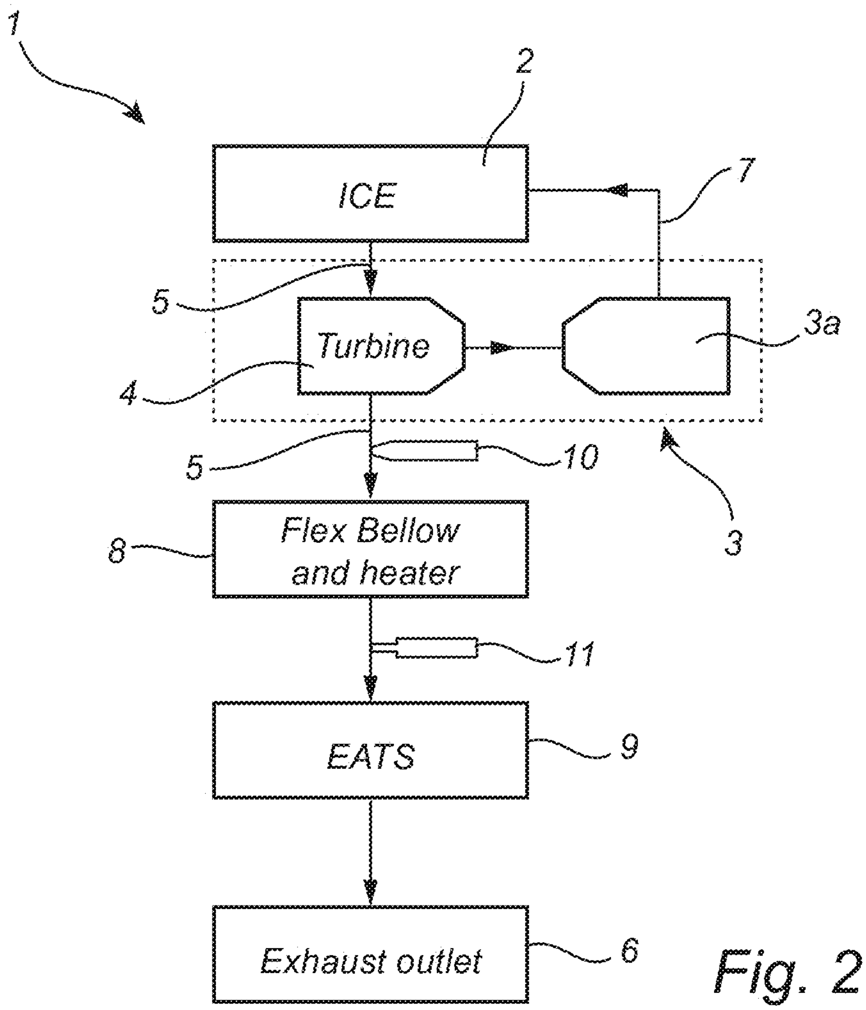
FIG. 2 is a flowchart of the ICE system according to an example.

FIG. 2 shows a flowchart of the ICE system 1 according to an example. The ICE system 1 comprising an ICE 2, such as a diesel engine. In the ICE system 1 as disclosed in FIG. 1, a turbocharger 3 comprising a turbine 4 is arranged downstream the ICE 1 in an exhaust conduit 5 for transporting exhaust gases from the ICE 1 to an exhaust outlet 6.

The turbocharger 3 of the ICE system 1 may generally refer to a well-known arrangement, in which a turbine 4 of the turbocharger 3 is arranged to receive exhaust gases from the ICE 2 and a compressor **3*a* is configured to compress intake air and feed the compressed intake air via an air intake line 7 to the ICE 2, while the turbine 4** being configured to convert engine exhaust gas into mechanical energy to drive the compressor.

The turbocharger 3 is however an optional feature of the present disclosure.

The ICE system 1 furthermore comprises a flex bellow 8, which may also be denoted as a flex coupling or a flex hub, arranged downstream the ICE 2 and the turbocharger 3 and which is arranged to receive the exhaust gases from the ICE 2. The flex bellow 8 may prevent, or at least reduce, vibration from the turbocharger 3 due to its structure.

An EATS 9 is disposed in the exhaust conduit 5 downstream the flex bellow 8. The EATS may include one or more of a pre-SCR, a DPF, a DOC, a first SCR catalyst and a second SCR catalyst (not shown). If present, the pre-SCR insert is arranged to receive exhaust gas entering the EATS 9 and the DPF is arranged downstream the pre-SCR. The EATS 9 preferably comprises one or more SCR catalyst(s).

A first reductant injector 10, such as a urea injector may be positioned in the exhaust pipe, upstream the flex bellow 8 for introducing a liquid reducing agent, such as urea. A second reductant injector 11 may be arranged upstream the first SCR catalyst.

The fact that the present ICE system 1 comprises the flex bellow 8 provided with the heater arranged downstream the first reductant injector 10, according to the present disclosure, has the advantage of pre-heating of the liquid reducing agent prior to entering the EATS 9 and additionally improving distribution of the liquid reducing agent caused by the turbulent gas flow. A technical benefit may include an improved efficiency of the ICE system 1.

Figure 3:
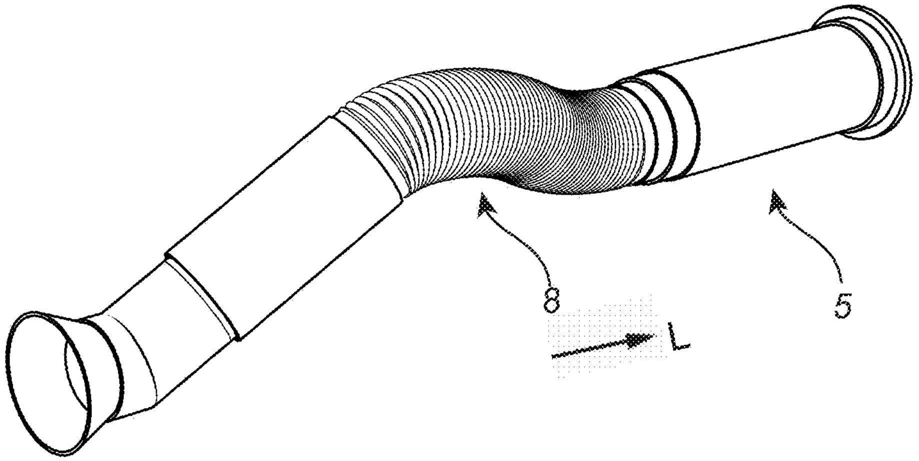
FIG. 3 is a perspective view of a flex bellow and the upstream exhaust pipe as disclose herein and according to an example.

FIG. 3 shows a perspective view of the flex bellow 8 and the exhaust pipe 5 upstream the flex bellow 8 according to an example. The flex bellow 8 and the exhaust pipe 5 extending in a longitudinal direction L. The flex bellow 8 of the ICE system 1 may generally refer to a convoluted tube junction, mechanically joining the two ends of the exhaust pipe, and forming part of the exhaust pipe, and is provided to convey the exhaust gas therein. The primary use thereof is generally to aid in absorbing excess vibrations and movement caused by the engine and the linear movement as the exhaust system heats up and expands during use. However, according to the present disclosure a further technical benefit is that it prevents, at least partially reduces, the vibration from the turbocharger 3 to reach the EATS 9.

Figure 4:
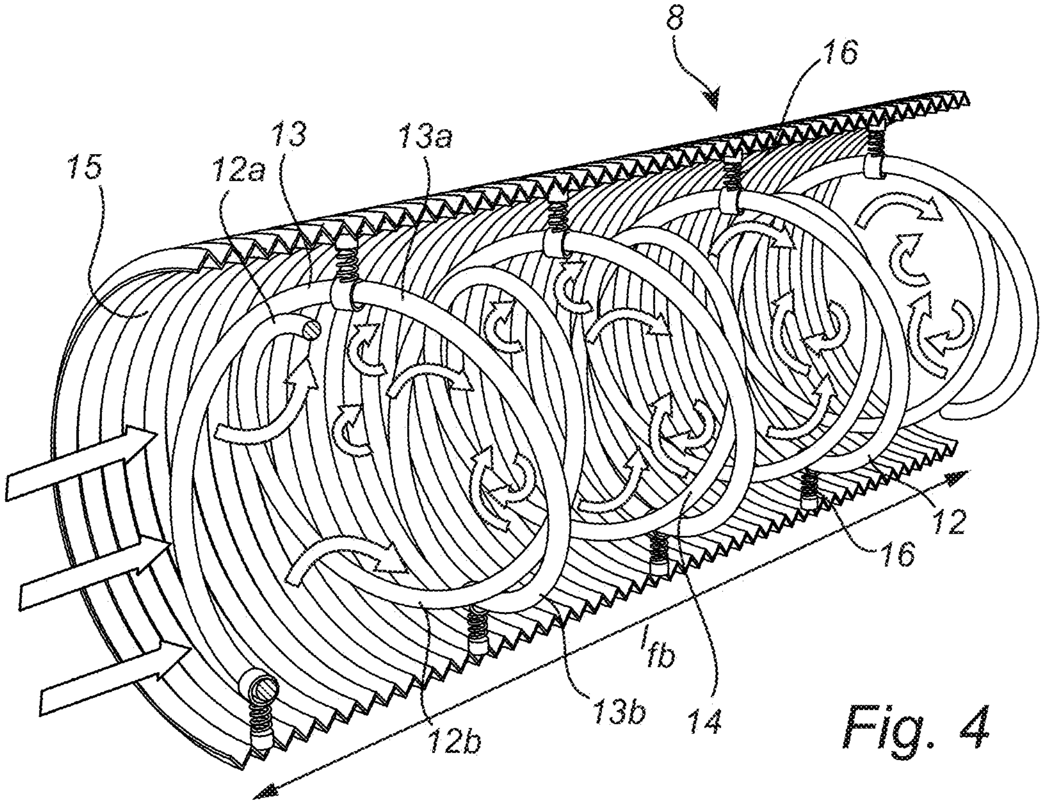
FIG. 4 shows a portion of the flex bellow according to an example such the interior of the flex bellow is illustrated.

FIG. 4 shows a portion of the flex bellow 8 according to an example such the interior of the flex bellow 8 is illustrated. The flex bellow 8 comprises a heater arrangement 12 being arranged within the flex bellow 8. The heater arrangement 12 is in the form of a coil, in the figure a first coil 12*a* having one or more heating regions 13 and one or more portions 14 configured to induce turbulent flow of the exhaust gases. In FIG. 4, the heater arrangement 12 comprises a second coil 12*b*, the first and second coil 12*a*, 12*b* having phase difference such that the first coil 12*a* is arranged with an anti-clockwise rotation and the second coil 12*b* is arranged with a clockwise rotation. However, the heater arrangement 12 according to the present disclosure may comprise one single coil or alternatively three or four coils. The heater arrangement 12 may alternatively be provided with both clockwise directions or both anti-clockwise directions with a phase difference.

By "turbulent flow" is meant an irregular flow wherein the flow undergoes irregular fluctuations, in contrast to a laminar flow. The turbulent flow is at least partly caused by the shape of the heater arrangement 12.

The heater arrangement 12 in FIG. 4 comprises two coils 12*a*, 12*b* having a helical shape and being arranged in the flex bellow 8, each coil 12*a*, 12*b* comprising two or more loops 13*a*, 13*b*. The coils 12*a*, 12*b* each extend along the entire length $l_{fb}$ of the flex bellow 8 in this figure. However, alternatively, the coil(s) may extend along ⅓ or more, or along ½ or more of, the length $l_{fb}$ of the flex bellow 8.

The heater arrangement 12 is arranged with a distance to an inner surface 15 of the flex bellow 8, thereby providing a gap between the heater arrangement 12 and the inner surface 15 of the flex bellow 8. The fact that heater arrangement 12 is provided with a distance to the inner surface 15 of the flex bellow 8 allows the exhaust gases to be in contact with the a larger surface area of the heater arrangement 12 making the heating more effective and it also causes an irregular flow of the exhaust gas thereby inducing the turbulent flow, which provides an improved mixing of the reductant from the first reductant injector 10.

The heater arrangement is connected to an inner surface 15 of the flex bellow by one or more connection points 16. The one or more connection points 16 may comprise an insulating flexible material, and may furthermore comprise a spring connection. The fact that the one or more connection points comprises insulating and/or a spring connection provides vibration damping transferring to the coil 12 from flex bellow 8 and avoids transfer of heat from the coil 12 to the flex bellow 8.

The one or more heating regions 14 may extend over at least ⅓ of a total length $l_c$ of the coils 12*a*, 12*b*. Alternatively, the one or more heating regions extend over at least ½ of the total length $l_c$ of the coils 12*a*, 12*b*, or over the entire length $l_c$ of the coil.

Figure 5:
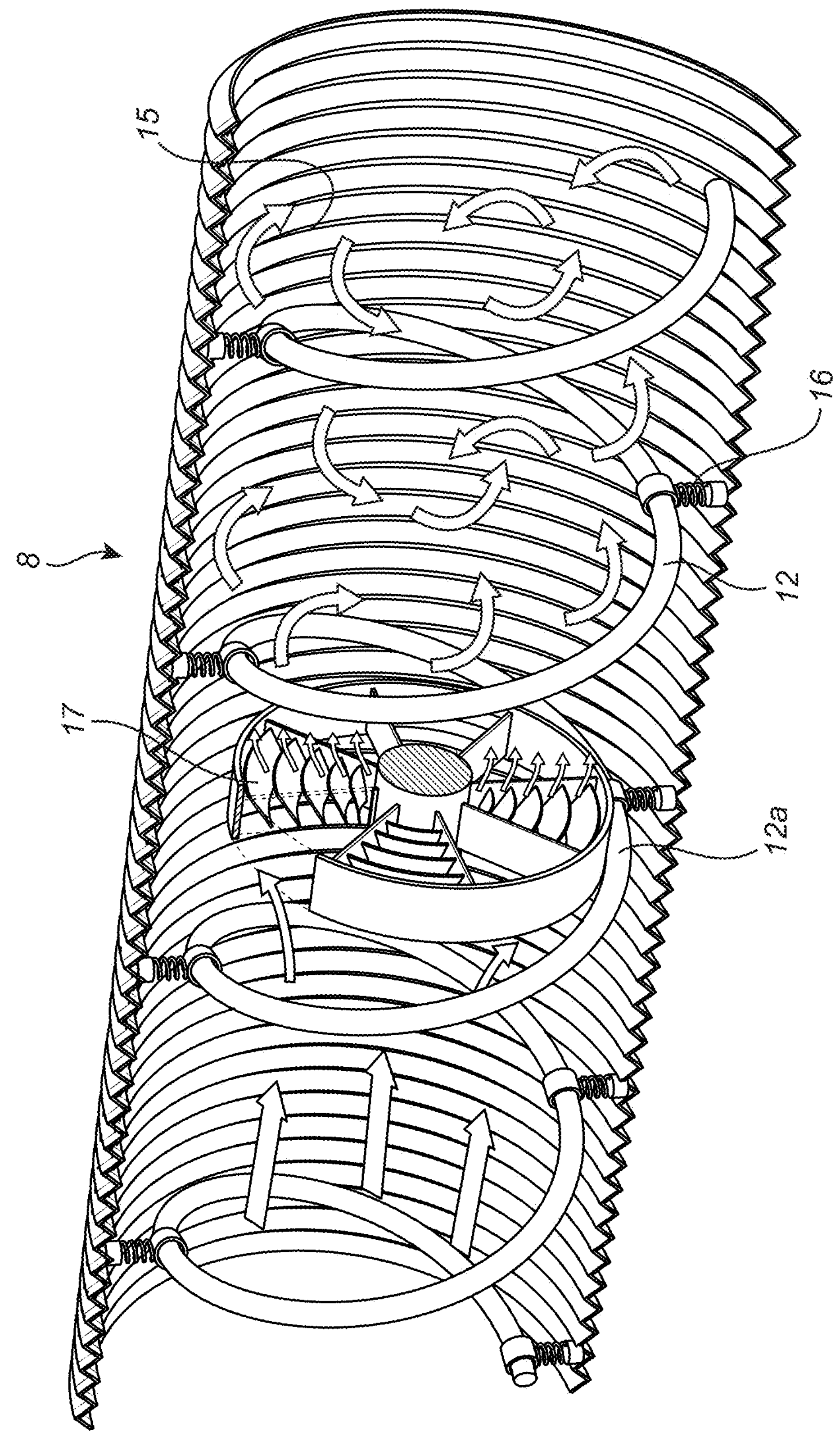
FIG. 5 shows a portion of the flex bellow according to a further example such the interior of the flex bellow is illustrated.

FIG. 5 illustrates a portion of the interior the flex bellow 8 according to an example. The flex bellow 8 comprises the heater arrangement 12 being arranged within the flex bellow 8. The heater arrangement 12 has a coil 12*a* having a helical shape and configured to induce turbulent flow of the exhaust gases. The heater arrangement is connected to the inner surface 15 of the flex bellow by one or more connection points 16. The one or more connection points 16 may comprise an insulating flexible material, and may furthermore comprise a spring connection. In the example shown in FIG. 5, the flex bellow 8 comprises a second turbulent flow inducing device 17 in the form of a stationary propeller-shaped device. The stationary propeller-shaped device 17 is arranged within the coil 12*a* and provides a further induced turbulent flow of the exhaust gases.

EXAMPLE LIST

Example 1: An internal engine combustion (ICE) system, comprising:

- an ICE;
- an exhaust conduit for transporting exhaust gases from the ICE to an exhaust outlet;
- an EATS disposed in the exhaust conduit downstream the ICE;
- a flex bellow disposed in-between the ICE and the EATS; and
- a heater arrangement, the heater arrangement being arranged within the flex bellow and further provided in the form of a coil having one or more heating regions and one or more portions configured to induce turbulent flow of the exhaust gases.

Example 2: The ICE system of example 1, wherein the ICE system further comprises a turbocharger arrangement having a turbine disposed downstream the ICE in the exhaust conduit and wherein the flex bellow is disposed in-between the turbine and the EATS.

Example 3: The ICE system of example 1 or 2, wherein the coil is any one of a helical-shaped coil, spiral shaped coil or a conical shaped coil.

Example 4: The ICE system of any one of examples 1 to 3, wherein the coil extends along ⅓ or more of a length of the flex bellow.

Example 5: The ICE system of any one of examples 1 to 3, wherein the coil extends along ½ or more of a length of the flex bellow.

Example 6: The ICE system of any one of examples 1 to 3, wherein the coil extends along the entire length of the flex bellow.

Example 7: The ICE system of any one of the preceding examples, wherein the heater arrangement is arranged with a distance to an inner surface of the flex bellow, thereby providing a gap between the heater arrangement and the inner surface of the flex bellow.

Example 8: The ICE system of any one of the preceding examples, wherein the heater arrangement is connected to an inner surface of the flex bellow by one or more connection points.

Example 9: The ICE system of example 8, wherein the one or more connection points comprises an insulating flexible material.

Example 10: The ICE system of example 8 or 9, wherein the one or more connection points comprise(s) a spring connection.

Example 11: The ICE system of any one of the preceding examples, wherein a urea injector is arranged in-between the turbine and the flex bellow.

Example 12: The ICE system of any one of the preceding examples, wherein the one or more heating region is/are arranged in an upstream portion of the flex bellow, the upstream portion constituting of ⅓ of the flex bellow, as seen in a length direction (L) of the flex bellow.

Example 13: The ICE system of any one of the preceding examples, wherein the heater arrangement is provided in the form of a coil comprising two or more loops.

Example 14: The ICE system of any one of the preceding examples, wherein the heater arrangement is provided in the form of a coil comprising three or more loops.

Example 15: The ICE system of any one of the preceding examples, wherein the one or more heating regions extend over at least ⅓ of a total length of the coil.

Example 16: The ICE system of any one of examples 1 to 14, wherein the one or more heating regions extend over the entire length of the coil.

Example 17: The ICE system of any one of the preceding examples, wherein the flex bellow comprises a second turbulent flow inducing device.

Example 18: The ICE system of example 17, wherein the second turbulent flow inducing device is a stationary propeller-shaped device.

Example 19: The ICE system of example 18, wherein the stationary propeller-shaped device is arranged within the coil.

Example 20: A vehicle comprising the ICE system according to any one of the preceding examples The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An internal combustion engine (ICE) system, comprising:

an ICE;

an exhaust conduit for transporting exhaust gases from the ICE to an exhaust outlet;

an exhaust aftertreatment system (EATS) disposed in the exhaust conduit downstream the ICE;

a flex bellow disposed in-between the ICE and the EATS;

a reductant injector arranged in-between the ICE and the flex bellow; and a heater arrangement, the heater arrangement being arranged within the flex bellow and further provided in the form of a coil having one or more heating regions and one or more portions configured to induce turbulent flow of the exhaust gases mixed with reductant;

wherein the flex bellow comprises a single cavity defined by an inner wall of the flex bellow, the single cavity being configured to receive the exhaust gases mixed with reductant via a common inlet.

2. The ICE system of claim 1, wherein the ICE system comprises a turbocharger arrangement having a turbine disposed downstream the ICE in the exhaust conduit and wherein the flex bellow is disposed in-between the turbine and the EATS.

3. The ICE system of claim 1, wherein the coil is any one of a helical-shaped coil, spiral shaped coil or a conical shaped coil.

4. The ICE system of claim 1, wherein the coil extends along ½ or more of a total length of the flex bellow.

5. The ICE system of claim 1, wherein the coil extends along the entire length of the flex bellow.

6. The ICE system of claim 1, wherein the heater arrangement is arranged with a distance to an inner surface of the flex bellow, thereby providing a gap between the heater arrangement and the inner surface of the flex bellow.

7. The ICE system of claim 1, wherein the heater arrangement is connected to an inner surface of the flex bellow by one or more connection points.

8. The ICE system of claim 7, wherein the one or more connection points comprises an insulating flexible material.

9. The ICE system of claim 1, wherein the one or more heating region is/are arranged in an upstream portion of the flex bellow, the upstream portion constituting of ⅓ of the flex bellow, as seen in a length direction of the flex bellow.

10. The ICE system of claim 1, wherein the heater arrangement is provided in the form of a coil comprising two or more loops.

11. The ICE system of claim 1, wherein the one or more heating regions extend over the entire length of the coil.

12. The ICE system of claim 1, wherein the flex bellow comprises a second turbulent flow inducing device.

13. The ICE system of claim 12, wherein the second turbulent flow inducing device is a stationary propeller-shaped device.

14. A vehicle comprising the ICE system of claim 1.

* * * * *